Feb. 6, 1968
A. P. MERIANO
3,367,682
SEALED JOINT EMPLOYING PRESSURE LOADED
AND MECHANICALLY LOADED SEAL
Filed Oct. 19, 1964
2 Sheets-Sheet 1
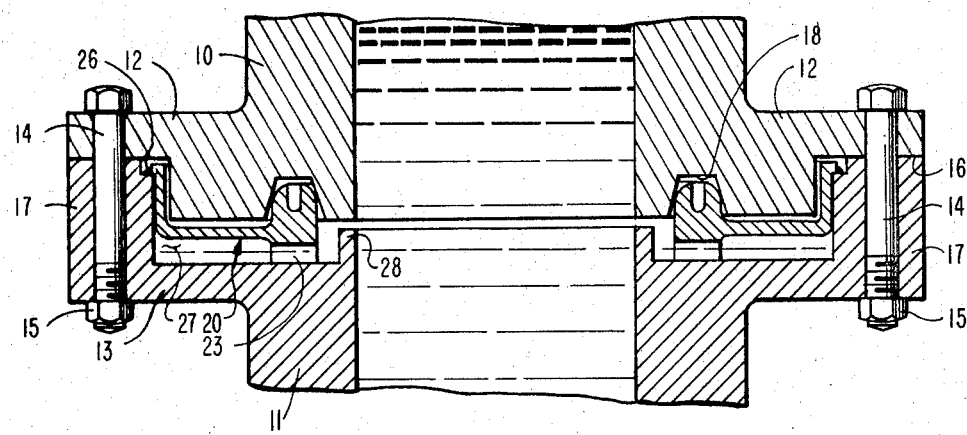
FIG.—1
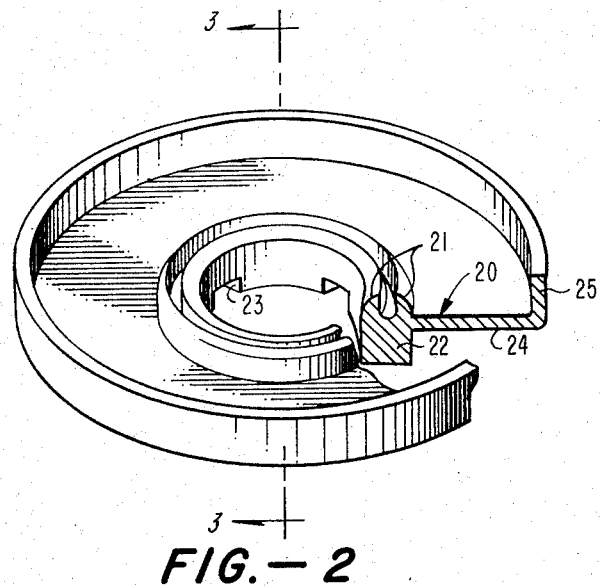
FIG.—2
INVENTOR.
ALBERT P. MERIANO
BY Edward O. Ansell
William E. Hiller
ATTORNEYS

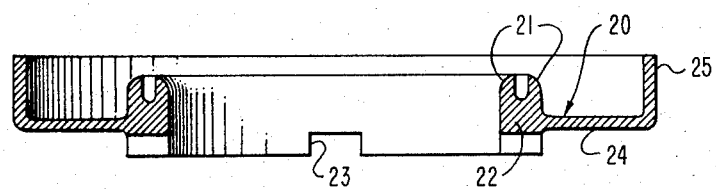
FIG.—3
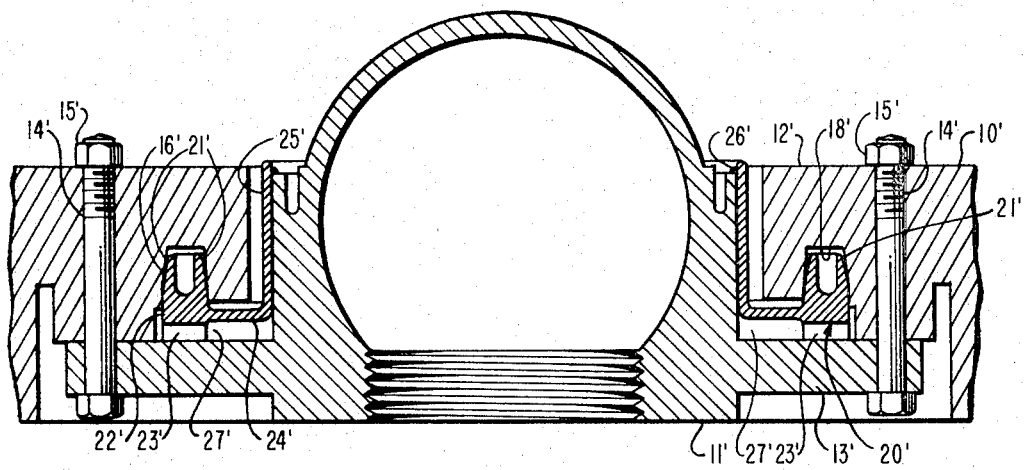
FIG.—4
INVENTOR.
ALBERT P. MERIANO

United States Patent Office 3,367,682
Patented Feb. 6, 1968

3,367,682
SEALED JOINT EMPLOYING PRESSURE LOADED
AND MECHANICALLY LOADED SEAL
Albert P. Meriano, Fair Oaks, Calif., assignor to Aerojet-
General Corporation, Azusa, Calif., a corporation of
Ohio
Filed Oct. 19, 1964, Ser. No. 404,705
3 Claims. (Cl. 285—106)

The present invention generally relates to a sealed joint between stationary members and to a sealing device interposed between the stationary members for forming the sealed joint therebetween. More particularly, the invention concerns an annular seal for sealing a joint between stationary members adapted to confine or contain fluids under high pressures.

In sealing joints by the use of a sealing device, the sealing device should provide an effective seal against high and low pressures to which it is likely to be subjected. Where a sealing device is ordinarily intended to provide a seal against pressure of a relatively high magnitude, the sealing device is frequently constructed so as to take advantage of the high pressure in enhancing the effectiveness of the seal. In the latter respect, the sealing device is constructed to present seal portions acted on by the high pressure so as to be more tightly pressed against an opposed joint surface in forming the seal. Should pressure of a relatively low magnitude develop, the sealing device may be inclined to malfunction because of a reduced pressure of insufficient magnitude acting on the sealing portion which does not bring about proper pressure loading of the sealing portion against the opposed joint surface, thereby permitting leakage between the sealing device and the joint surface to occur.

It is, therefore, an object of the present invention to provide a novel sealed joint construction employing a sealing device which is so constructed and arranged as to be subjected to pressure loading and mechanical loading thereagainst for enhancing the effectiveness of the sealing engagement between the sealing device and an opposed joint surface, wherein the sealing device is effective to seal against pressures of relatively high and low magnitudes.

It is another object of this invention to provide an improved sealing device which effectively seals against pressures of relatively high and low magnitudes, wherein the sealing device may be subjected to either pressure loading or mechanical loading or both to increase the effectiveness of its sealing engagement with an opposed surface without destroying its sealing capability should it be desired to use the sealing device in another joint installation or to reassemble the joint structure of which it is a component part.

Certain objects of the invention having been stated, other objects will become apparent as the specification proceeds when taken together with the accompanying drawings in which:

FIG. 1 is a fragmentary longitudinal sectional view through a joint formed between two members of a pressure-confining structure, such as a pair of connected pipes, wherein the joint is sealed by a sealing device constructed in accordance with the present invention;

FIG. 2 is a perspective view of the sealing device illustrated in FIG. 1, partially broken away to show the sealing device in longitudinal section;

FIG. 3 is a longitudinal sectional view of the sealing device taken along the line 3—3 of FIG. 2; and FIG. 4 is a fragmentary longitudinal sectional view through a joint formed between two members of a pressure-confining structure, such as a pressure vessel, wherein the joint is sealed by a modified form of the sealing device illustrated in FIG. 1.

Referring more specifically to the drawings, FIG. 1 illustrates a sealed joint between two sections of a pressure-confining structure, such as a pair of connected pipes defining a fluid passageway through which fluid under a pressure of a relatively high magnitude is adapted to flow. The joint comprises a first structural member or pipe 10 and a second structural member or pipe 11 which are connected together. The two pipes 10 and 11 are provided with opposed annular radial flanges 12 and 13, respectively, defining the joint therebetween. Suitable securing means are provided for fastening the pipes 10, 11 together, such as a plurality of bolts 14 extending through the opposed flanges 12, 13 and nuts 15 threadably received by the bolts 14.

In accordance with the present invention, the joint formed between the pipes 10, 11 is provided with a fluid-tight seal to prevent the leakage of pressure fluid outwardly from the passageway extending through the pipes 10, 11. To this end, the flange 12 of the pipe 10 is provided with an outer annular recess 16 in its radial surface opposed to the pipe 11. The flange 13 of the pipe 11 has a radially outwardly disposed annular axial extension 17 directed toward the pipe 10. The annular axial extension 17 of the flange 13 is received within the outer recess 16 of the flange 12. The axial extension 17 is longer than the depth of the recess 16 and abuts the flange 12 so as to axially space the radially inwardly disposed portion of the flange 13 and the end of the pipe 11 from the opposing flange 12 and the end of the pipe 10 when the bolts 14 are tightened by causing the nuts 15 threadably received thereby to be relatively moved upwardly thereon to draw the pipes 10, 11 and their flanges 12, 13 toward each other.

The end of the pipe 10 opposed to the end of the pipe 11 is provided with an annular tapered groove 18 therein, the groove 18 opening toward the opposed radial end surface of the pipe 11 which is axially spaced from the radial end surface of the pipe 10. The groove 18 is axially tapered in a direction away from the opposed radial end surface of the pipe 11 so as to have a mouth wider than the bottom wall thereof and inclined side walls convergent toward the bottom wall.

A sealing device in the form of an annular seal 20 is disposed in the joint formed between the pipes 10, 11. The seal 20 comprises an annular channel-shaped body portion which includes a pair of forwardly extending axial sealing lips 21, 21 connected at their rear ends by a web 22 integral therewith. The web 22 is relatively thick as compared to the axial sealing lips 21, 21 and is provided with a plurality of spaced radial slots 23 extending therethrough, the radial slots 23 being formed in the rear end portion of the web 22. The seal 20 further comprises a resilient annular diaphragm 24 integral with the channel-shaped body portion and connected to the web 22 forwardly of the radial slots 23. The diaphragm 24 extends radially outwardly from the web 22 and is provided with a resilient annular axial flange 25 extending forwardly in the same direction as the pair of sealing lips 21, 21.

The seal 20 is arranged with the pair of sealing lips 21, 21 of its channel-shaped body portion received in the groove 18 in the end of the pipe 10. The rear end of the web 22 is disposed adjacent the opposed radial end surface of the pipe 11 which is axially spaced from the radial end surface of the pipe 10. The diaphragm 24 is loosely received in the space defined between the opposed ends and radial flanges 12, 13 of the pipes 10, 11, while the axial flange 25 of the diaphragm 24 is rigidly secured in pressure-tight relation at its forward end to the axial extension 17 of the flange 13 on the pipe 11 by suitable means, such as a weld 26.

The diaphragm 24 and the web 22 of the annular seal 20 cooperate with the pipe 11, its annular flange 13, and the annular axial extension 17 thereof to define an annular pressure chamber 27 in the space provided between the opposed radial end surfaces and flanges 12, 13 of the pipes 10, 11. The radial end surface of the pipe 11 has an annular axial rib 28 located at its inner periphery and directed toward the radial end surface of the pipe 10 but terminating short thereof to provide a space therebetween so that pressure fluid in the passageway through the pipes 10, 11 can be admitted into the chamber 27 through the radial slots 23 in the web 22 of the annular seal 20.

When the annular seal 20 is installed in place and the flanges 12, 13 are drawn together by tightening the bolts 14, the rear end of the web 22 is brought into abutment with the radial end surface of the pipe 11. Continued tightening of the bolts 14 causes the channel-shaped body portion of the annular seal 20 to be moved into the tapered groove 18 to dispose the sealing lips 21, 21 thereof in sealing engagement with the inclined side walls of the groove 18 such that the annular seal 20 is mechanically loaded in sealing relationship with the end of the pipe 10 to provide a sealed joint between the pipes 10, 11, even when fluid pressure of a relatively low magnitude is present in the passageway through the pipes 10, 11. Further tightening of the bolts 14 until the axial extension 17 of the flange 13 is brought into abutment with the recessed portion of the flange 12 causes the channel-shaped body portion of the annular seal 20 to be progressively wedged into the tapered groove 18 to increase the degree of sealing engagement between the sealing lips 21, 21 and the inclined side walls of the groove 18, thereby increasing the mechanical loading of the annular seal 20.

The existence of fluid pressure in the passageway also serves to enhance the sealing effectiveness of the annular seal 20. In this respect, pressure fluid from the passageway may pass radially outwardly between the axial rib 28 on the end of the pipe 11 and the opposed end of the pipe 10 so as to be admitted to the chamber 27 through the radial slots 23 in the web 22 of the annular seal 20. Fluid pressure within the chamber 27 is applied against the resilient diaphragm 24 in a direction tending to further wedge the channel-shaped body portion of the annular seal 20 into the tapered groove 18 which augments the degree of sealing engagement between the sealing lips 21, 21 and the inclined side walls of the groove 18. Fluid pressure also impinges against the rear end portion of the web 22, the fluid pressure acting in the same manner as the fluid pressure within the chamber to enhance the degree of sealing engagement between the sealing lips 21, 21 and the inclined side walls of the groove 18. Thus, the annular seal 20 may also be subjected to pressure loading, wherein the fluid pressure confined by the sealed joint is responsible for acting upon the annular seal 20 so as to increase its sealing effectiveness against the inclined side walls of the tapered groove 18, thereby preventing leakage of pressure fluid through the joint between the pipes 10, 11.

In FIG. 4, a modified form of the sealed joint in accordance with this invention is illustrated. FIG. 4 illustrates a fragmentary portion of a pressure vessel adapted to contain fluid under a pressure of a relatively high magnitude. The pressure vessel comprises a first structural member. The pressure vessel comprises a first structural member 10' in the form of a container or receptacle and a second structural member 11' in the form of an end closure or cover for closing an open end of the container 10'. The two members 10' and 11' are provided with opposed annular radial flanges 12' and 13', respectively, defining a joint therebetween. Suitable securing means are provided for fastening the end closure 11' to the container 10' to cover the open end thereof, such as a plurality of bolts 14' extending through the opposed flanges 12', 13' and nuts 15' threadably received by the bolts 14'.

The flange 12' of the member 10' is provided with an inner recess in its radial surface opposed to the corresponding radial surface of the flange 13' of the member 11'. Thus, the recessed portion 16' of the flange 12' is axially spaced from the flange 13', while the radially outer portion of the flange 12' is adapted to abut the flange 13' when the bolts 14' are tightened by causing the nuts 15' threadably received thereby to be relatively moved upwardly thereon to draw the members 10', 11' and their flanges 12', 13' together.

The recessed portion 16' of the flange 12' is provided with an annular tapered groove 18' therein, the groove 18' opening toward the opposed radial surface of the flange 13' which is axially spaced from the recessed portion 16' of the flange 12'. The groove 18' corresponds to the groove 18 of FIG. 1 in that it is axially tapered in a direction away from the opposed radial surface of the flange 13' so as to have a mouth wider than the bottom wall thereof and inclined side walls convergent toward the bottom wall.

The modified annular seal 20' is disposed in the joint formed between the members 10', 11'. The seal 20' corresponds to the seal 20 of FIGS. 1-3, inclusive, except that its resilient annular diaphragm 24', which is integrally connected to the web 22' of the annular channel-shaped body portion forwardly of the radial slots 23', extends radially inwardly from the web 22' rather than radially outwardly therefrom. The diaphragm 24' is provided with a resilient annular axial flange 25' extending forwardly in the same direction as the pair of sealing lips 21', 21'.

The seal 20' is arranged with the pair of sealing lips 21', 21' of its channel-shaped body portion received in the groove 18' in the recessed portion 16' of the flange 12'. The rear end of the web 22' is disposed adjacent the opposed radial surface of the flange 13' which is axially spaced from the recessed portion 16' of the flange 12'. The diaphragm 24' is loosely received in the space defined between the recessed portion 16' of the flange 12' and the radial surface of the flange 13' opposed thereto, while the axial flange 25' of the diaphragm 24' is rigidly secured in pressure-tight relation at its forward end to the member 11' by suitable means, such as a weld 26'.

The diaphragm 24' and the web 22' of the annular seal 20' cooperate with the member 11' and its annular flange 13' to define an annular pressure chamber 27' in the space provided between the recessed portion 16' of the flange 12' and the opposed radial surface of the flange 13'. The radial slots 23' in the web 22' of the annular seal 20' communicate with the chamber 27'.

When the annular seal 20' is installed in place and the flanges 12', 13' are drawn together by tightening the bolts 14', the rear end of the web 22' is brought into abutment with the flange 13'. It will be understood that continued tightening of the bolts 14' causes the channel-shaped body portion of the annular seal 20' to be moved into the tapered groove 18' to dispose the sealing lips 21', 21' thereof in sealing engagement with the inclined side walls of the groove 18' in a manner similar to that previously described in connection with the form of the invention shown in FIG. 1 for mechanically loading the annular seal 20' in sealing relationship with the flange 21'.

The existence of fluid pressure within the container or member 10' also serves to enhance the sealing effectiveness of the annular seal 20'. In this respect, pressure fluid from the container or member 10' may pass between the abutting radial surfaces of the flanges 12', 13' disposed radially outwardly of the annular seal 20' so as to be admitted to the chamber 27' through the radial slots 23' in the web 22' of the annular seal 20'. As in the form of the invention shown in FIG. 1, fluid pressure within the chamber 27' is applied against the resilient diaphragm 24' and the rear end portion of the web 22' in a direction tending to further wedge the channel-shaped body portion of the annular seal 20' into the tapered groove 18' which augments the degree of sealing engagement between the sealing lips 21', 21' and the inclined side walls of the groove 18'. Thus, the annular seal 20' may also be subjected to pressure loading in preventing leakage of pressure fluid from the container or member 10'.

Preferably, the annular seal 20 or 20' in accordance with this invention is metallic, being made of a corrosion-resistant metal, with the channel-shaped body portion thereof being more ductile than the material in which the tapered groove 18 or 18' is formed to provide for some yielding of the channel-shaped body portion as it is wedged progressively deeper in the tapered groove. This allows an increased area of sealing engagement between the channel-shaped body portion of the annular seal and the convergent inclined side walls of the tapered groove. The diaphragm of the annular seal is resilient and is placed under a slight axially directed stress when the opposed flanges of the members forming the joint are tightly secured together so as to exert a biasing force tending to urge the channel-shaped body portion of the annular seal further into the tapered groove. The annular seal may be made of a material other than metal, however, such as a suitable elastomeric sealing material.

It should be understood that the embodiments of the invention which have been described and shown herein are by way of preferred examples only and should not be construed as limitative of the scope of the invention, since various modifications thereof may be made by those skilled in the art without departing from the scope of the invention as defined by the appended claims.

I claim:
1. In combination,
   (a) first and second members disposed in opposed relation and defining a joint therebetween,
   (b) one of said members having an annular groove in its surface facing an opposed surface of the other member,
   (c) an annular seal comprising
      (1) an annular body portion,
      (2) an annular resilient diaphragm integral with said body portion and extending radially therefrom, said diaphragm having an axial flange at its end remote from said body portion,
      (3) said body portion having a plurality of radial slots provided therein and disposed rearwardly of said diaphragm, and
      (4) the axial flange at the end of said diaphragm remote from said body portion extending in a forward direction with respect to the radial slots provided in said body portion;
   (d) said annular seal being disposed with its body portion received in the groove in said one member in sealing engagement with said one member,
   (e) the rear end portion of said body portion being seated against the opposed surface of said other member,
   (f) the axial flange of said diaphragm being rigidly secured in pressure-tight relation at its forward end to said other member, and
   (g) means for drawing said first and second members together for forcing said body portion toward the bottom wall of the groove in said one member to increase the degree of sealing engagement between said body portion and said one member,
   (h) whereby pressure fluid may enter between the opposed surfaces of said first and second members to be admitted through the radial slots in said body portion so as to be directed against said diaphragm for applying pressure thereagainst in a direction tending to urge said body portion toward the bottom wall of the groove for augmenting the degree of sealing engagement between said body portion and said one member.

2. In combination,
   (a) first and second members disposed in opposed relation and defining a joint therebetween,
   (b) one of said members having an annular tapered groove in its surface facing an opposed surface of the other member, said groove opening toward the opposed surface of the other member and being axially tapered in a direction away from the opposed surface of the other member so as to define a mouth for the groove wider than the bottom wall thereof and inclined side walls convergent toward the bottom wall,
   (c) an annular seal comprising
      (1) an annular channel-shaped body portion defining a pair of forwardly extending axial seal-lips connected at the rear ends thereof by a web,
      (2) an annular resilient diaphragm integral with said channel-shaped body portion and extending radially from said web, said diaphragm having an axial flange at its end remote from said body portion, said axial flange extending in the same direction as the pair of sealing lips of said channel-shaped body portion, and
      (3) said web having a plurality of radial slots provided in the rear end portion thereof and disposed rearwardly of said diaphragm;
   (d) said annular seal being disposed with the pair of sealing lips of its channel-shaped body portion received in the tapered groove in said one member, said sealing lips being respectively disposed in sealing engagement with the inclined side walls of the groove,
   (e) the rear end portion of said web being seated against the opposed surface of said other member,
   (f) the axial flange of said diaphragm being rigidly secured in pressure-tight relation at its forward end to said other member, and
   (g) means for drawing said first and second members together for forcing said pair of sealing lips toward the bottom wall of the groove in said one member to increase the degree of sealing engagement between said sealing lips and the inclined side walls of the groove,
   (h) whereby pressure fluid may enter between the opposed surfaces of said first and second members to be admitted through the radial slots in said web so as to be directed against said diaphragm for applying pressure thereagainst in a direction tending to urge said sealing lips toward the bottom wall of the groove for augmenting the degree of sealing engagement between said sealing lips and the inclined side walls of the groove.

3. In combination,
   (a) first and second members disposed in opposed relation and defining a joint therebetween,
   (b) one of said members having an annular groove in its surface facing an opposed surface of the other member,
   (c) an annular seal comprising
      (1) an annular body portion,
      (2) an annular resilient diaphragm integral with said body portion and extending radially therefrom, and
      (3) said body portion having a plurality of radial slots provided therein and disposed rearwardly of said diaphragm;
   (d) said annular seal being disposed with its body portion received in the groove in said one member in sealing engagement with said one member, said body portion and the walls defining said groove being disposed in wedging relationship,
   (e) the rear end portion of said body portion being seated against the opposed surface of said other member,
   (f) means to secure the end of said diaphragm remote from said body portion in pressure-tight relation to said other member,
   (g) means connecting said first and second members together,
   (h) said first and second members having opposed abutting surfaces and opposed spaced apart surfaces, said opposed spaced apart surfaces of said first and second members including the surface of said one member in which said groove is provided, (i) said diaphragm extending between said opposed spaced apart surfaces of said first and second members in respective spaced relation to each of said opposed spaced apart surfaces, and (j) said diaphragm being placed under stress when said first and second members are connected together by said connecting means for exerting a biasing force on said body portion in a direction urging said body portion toward the bottom wall of the groove in said one member, (k) whereby pressure fluid may enter between the opposed surfaces of said first and second members to be admitted through the radial slots in said body portion so as to be directed against said diaphragm for applying pressure thereagainst in a direction tending to urge said body portion toward the bottom wall of the groove for augmenting the degree of sealing engagement between said body portion and said one member.

References Cited

UNITED STATES PATENTS

| | | | |
|---|---|---|---|
| 3,204,971 | 9/1965 | Meriano | 277—171 |
| 1,916,598 | 7/1933 | Ayres et al. | 285—331 X |
| 2,186,020 | 1/1940 | Hall | 277—171 |
| 2,856,206 | 10/1958 | Barber | 285—225 X |
| 3,179,445 | 4/1965 | Moretti | 285—106 |

FOREIGN PATENTS 723,599   8/1942   Germany.

EDWARD C. ALLEN, *Primary Examiner.*

CARL W. TOMLIN, *Examiner.*

RICHARD G. BERKLEY, *Assistant Examiner.*